United States Patent [19]
Korpi

[11] Patent Number: 5,700,122
[45] Date of Patent: Dec. 23, 1997

[54] QUICK TIGHTENING FASTENER

[76] Inventor: John G. Korpi, 14399 Ramblewood, Livonia, Wayne County, Mich. 48154

[21] Appl. No.: 758,271

[22] Filed: Nov. 29, 1996

[51] Int. Cl.⁶ ................................................ F16B 21/00
[52] U.S. Cl. ........................ 411/551; 411/299; 411/553; 411/432; 411/437
[58] Field of Search ........................ 411/549, 550, 411/551, 553, 299, 419, 437, 432

[56] References Cited

U.S. PATENT DOCUMENTS

| | | | |
|---|---|---|---|
| 2,486,411 | 11/1949 | Huelster | 411/551 |
| 2,624,609 | 1/1953 | Storm | 411/299 |
| 2,757,429 | 8/1956 | Summers | 411/551 |
| 4,801,231 | 1/1989 | Everman | 411/432 |
| 5,292,217 | 3/1994 | Korpi | 411/419 |

FOREIGN PATENT DOCUMENTS 655055  4/1929  France .................................. 411/437

*Primary Examiner*—Flemming Saether
*Attorney, Agent, or Firm*—Peter A. Taucher; Gail S. Soderling

[57] ABSTRACT

A quick-attachment fastener has an elongate barrel and a plunger translatable in forward and aft directions in the barrel. A pivot pin in the barrel extends through the plunger and has an axis fixed relative to the barrel. An arm on the pin swings between a retracted position in the barrel and a deployed position where the arm extends from the barrel. An aft facing part of the plunger engages the arm so that a spring biasing the plunger urges the arm toward the deployed position. A forward facing part of the plunger opposes the arm so that aft plunger translation swings the arm to the retracted position.

3 Claims, 5 Drawing Sheets

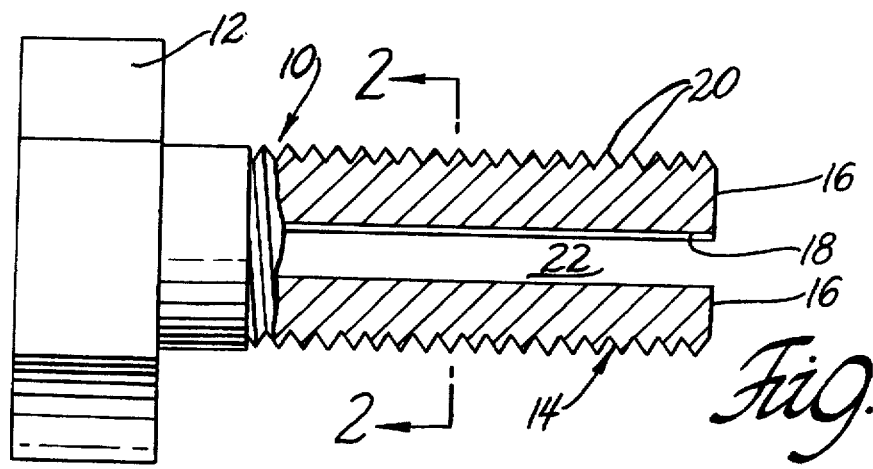
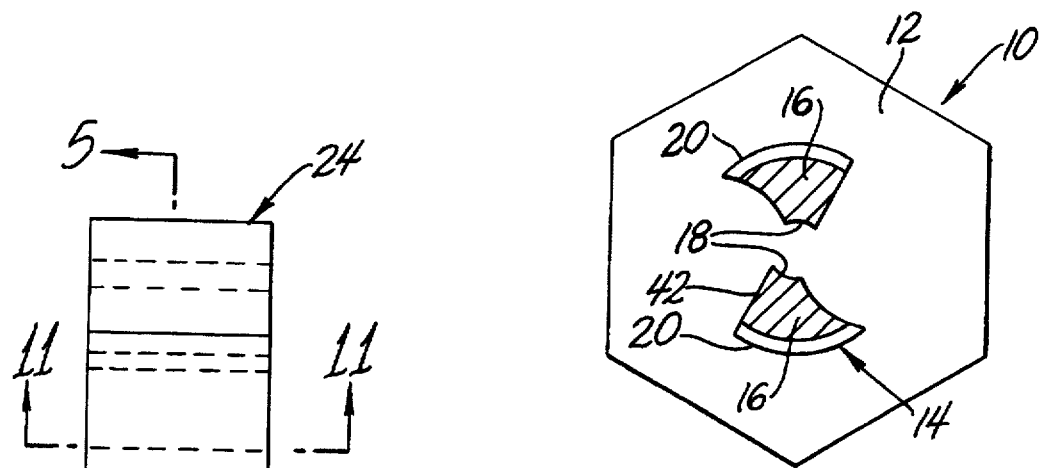
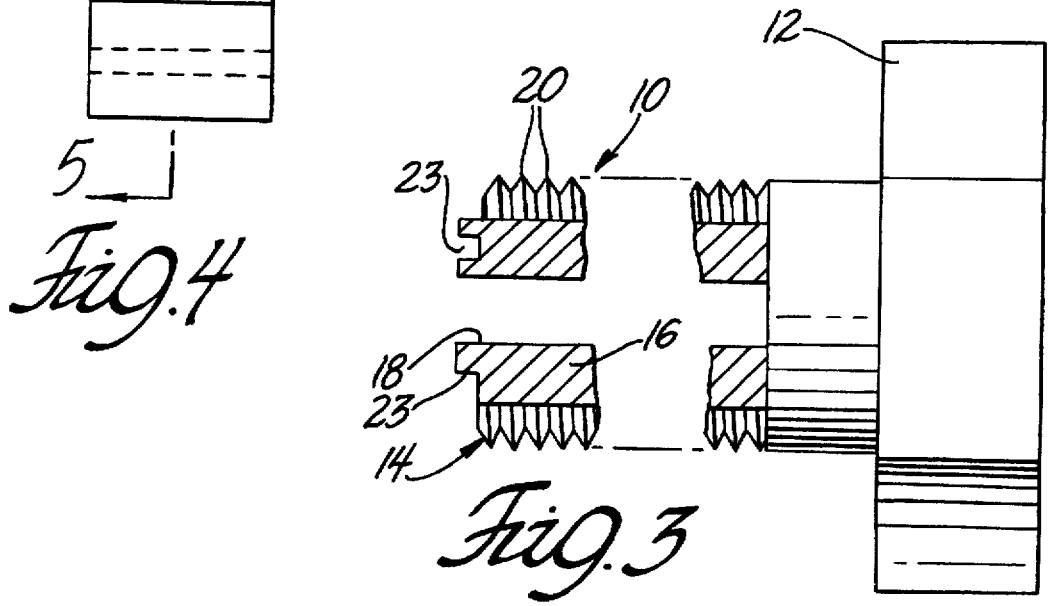

QUICK TIGHTENING FASTENER

GOVERNMENT USE

The invention described here may be made, used and licensed by or for the U.S. Government for governmental purposes without paying me a royalty.

BACKGROUND AND SUMMARY

In one aspect this invention relates to fasteners. In yet a further aspect, this invention relates to quick lock fasteners. In particular, this invention relates to an improved quick fastener with improved torquing capability.

U.S. Pat. No. 5,292,217 disclosed a fastener which has a tubular barrel disposed along the fastener's longitudinal axis and a plunger translatable fore and aft in the barrel. This invention provided an improved quick speed nut type fastener. This particular speed nut device would provided rapid clamping and effective holding power for many applications but the total distance the nut could travel to provide clamping action was limited. There are circumstances were it is desirable to have a nut which can be brought into position close to the parts to be clamped and then a substantial force applied by increasing tightening of the nut.

BRIEF DESCRIPTION OF THE INVENTION

The present invention is an improved quick attachment threaded fastener assembly for attaching two or more pieces together. The fastener assembly has an externally threaded fastener having an enlarged head portion and an elongated body portion extending from said head. The elongated body portion is formed by a plurality of spaced arcuately cross sectioned leg members the leg members having a shaped inner surface. The inner surfaces of the legs define a shaped inner bore which extends along the longitudinal axis of the externally threaded fastener for a substantial portion of its length. The legs have thread segments formed on the outer surface of the legs which effectively provides the elongated body with an externally helically threaded surface.

The fastener assembly of this invention has a first barrel shaped engaging means with a shaped internal cavity. A portion of the inner surface of the barrel's cavity is sufficiently large to allow easy longitudinal passage of the threaded fastener legs through the barrel and there are thread segments formed on a portion of the inner barrel surface complimentary to the thread segments of the threaded fastener. The barrel thread segments are adapted to engage the threaded fastener when the first barrel member is rotated.

The barrel engaging means has a shaped core member disposed within its walls the core sized to slide within the bore formed by the inner surfaces of the legs to prevent the legs from collapsing inward radially to an extent which would inhibit the thread segments of the fastener and barrel from properly engaging. The shaped core is held aligned and centered within the barrel by a plurality of radially disposed arms, the number of arms corresponding in number to the number of legs formed in the threaded fastener. The radial arms extend between the inner surface of the barrel and the outer surface of the core member the radial arms holding the core member axially aligned within the bore. The arms serve to spread and maintain the legs open during longitudinal movement of the engaging means along the threaded fastener.

A torque application member is associated with and disposed about the engaging means the torque applying member having an internally threaded bore engaging the outer threaded surface of the engaging means.

At least one locking means is associated with the engaging means and torque application member the locking means serving to keep the engaging member and torque application member joined until the thread segments of the engaging member have been rotated onto the thread segments on the threaded fastener and then disengaging to allow the torque applying member to rotate relative to the engaging member applying additional pressure to the parts being joined.

BRIEF DESCRIPTION OF THE DRAWING

FIG. 1 is a side view in partial section of a threaded fastener according to this invention;

FIG. 2 is a view taken along the line 2—2 of FIG. 1;

FIG. 3 is a side view in partial section of a second embodiment of this invention.

FIG. 4 is a side view of a fastener according to this invention;

DETAILED DESCRIPTION

Figure 5:
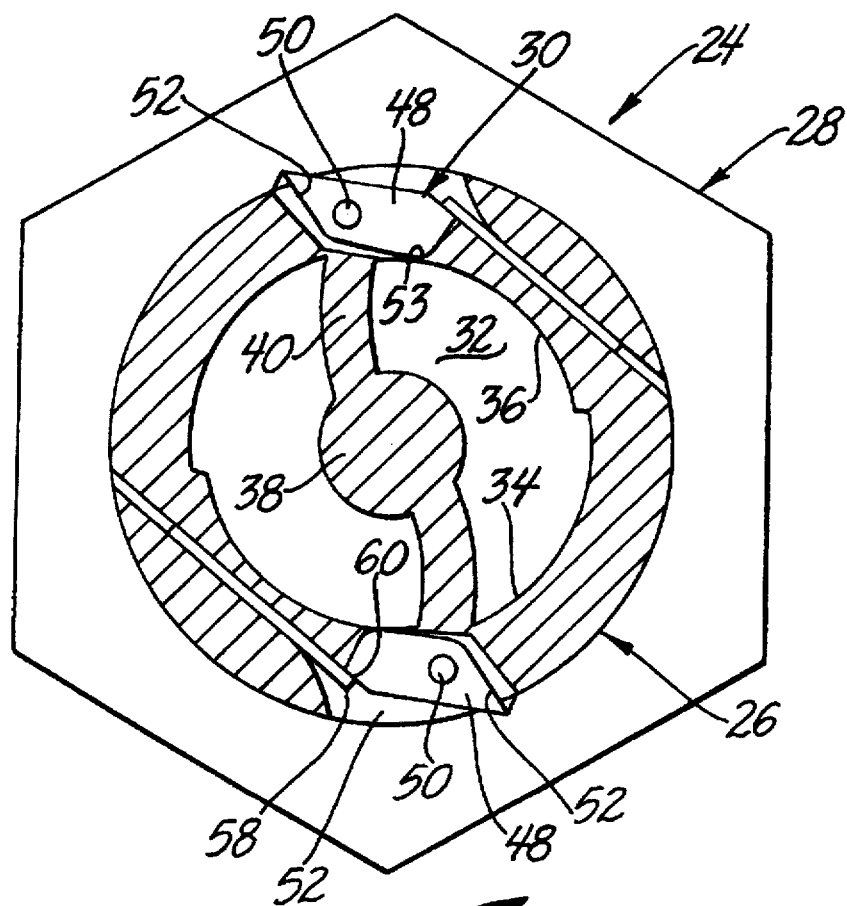
FIG. 5 is a front view in partial section of a fastener assembly according to this invention adapted to engage the threaded fastener of FIG. 3 with its locking means in its normal position.

Referring to the accompanying drawing in which like numerals refer to like parts, and initially to FIGS. 1 and 2, a shaped externally threaded fastener is designated generally 10. Threaded fastener 10 has an enlarged head portion 12 which can be used for handling the threaded fastener as with normal bolts and the like. While the head can be of any of the common type of fastener heads the head shown is of the normal hexagonal configuration for the purposes of illustration.

The threaded fastener 10 has an elongated body portion designated generally 14 extending from the head 12, the body portion being formed from a plurality of spaced, arcuately cross sectioned leg members 16, the leg members having a shaped inner surface 18, shown in FIG. 2, which defines a shaped inner bore 22 extending longitudinally and coaxially along the longitudinal axis of the externally threaded fastener 10. The legs 16 have a multiplicity of helically disposed teeth 20 formed on the outer surface of the legs 16. The teeth 20 form thread segments on the outer surface of the legs 16 allowing the legs to cooperate with an internally threaded member in a manner similar to an ordinary bolt and nut combination.

The legs 16 are shaped with an arcuate cross section to perform a number of functions as will be described later. The inner surfaces 18 are segments of a circle so the legs when disposed orthoganally to head 12 essentially define the cylindrical bore 22 disposed coaxially with the elongated body 14.

FIG. 3 shows an externally threaded fastener similar to that of FIG. 1 with the addition of recesses 23 formed in the terminal ends of the legs 16 allowing a pair of pliers or snap ring pliers to be used to align the legs if necessary. Stabilization is desirable in some cases since the legs are cantilevered and are easily bent or twisted by unbalanced forces when a threaded fastener is being torqued to engage the threads.

The externally threaded fastener 10 is shown with an internally threaded member designated generally 24 shown in FIG. 4 designed to engage the teeth 20 of the threaded fastener and the bore 22 as will described in detail hereinafter to provide a firm fastening means. The fastener of FIG. 4 is shown in partial section in FIGS. 5 and 6. Generally described, the internally threaded fastener has three main components, a barrel shaped portion or engaging means 26, a torque applying means 28 and a locking means 30. The barrel shaped engaging means 26 is externally threaded with a male thread 44 (see FIG. 11) engaging a complimentary female thread 46 located on the interior of torque applying means 28.

Figure 11:
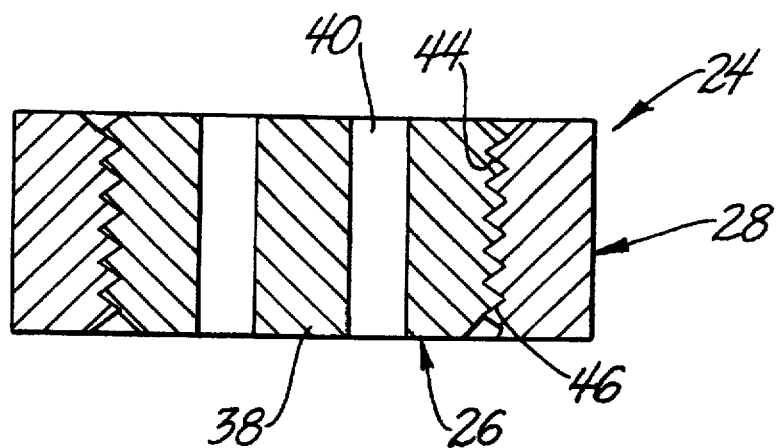
FIG. 11 is a partial sectional view of the fastener of FIG. 4 taken along the line 11—11.

In greater detail, the barrel shaped engaging means 26 is formed with shaped cavities 32, each of the cavities having an arcuate portion 34 of the barrel inner surface being formed with a sufficiently large diameter to allow easy noninterfearing, longitudinal movement of the outer surface of the threaded fastener legs 16 there through without interference with the teeth 20. The inner surface of the barrel has helical cam segments 36 complimentary to the teeth 20 of legs 16. The helical cam segments 36 are shaped and adapted to engage or disengage teeth 20 when barrel member 26 is rotated relative to legs 16. The barrel shaped engaging means 26 has a shaped core member 38 sized to engage the bore 22 formed by the inner surfaces of legs 16. The shaped core 38 will resist the tendency of the legs 16 to collapse inward radially as the barrel member longitudinally traverses the arms and the barrel member is rotated to engage the cam members 36 and teeth 20. As shown in FIG. 11, the shaped core 38 is basically cylindrical. If desired, the ends of the shaped core 38 can be tapered to allow easier passage of the shaped core within bore 22 as the shaped core traverses longitudinally along the bore.

The shaped core 38 is retained in an axially aligned position with respect to the barrel shaped means 26 by a plurality of radially disposed arms 40 which correspond in number to the legs 16 of the threaded fastener 10, arms 40 being attached to the inner surface of the barrel and the outer surface of the shaped core. The arms 40 cooperate with the shaped core 38 to keep the legs 16 separated both radially and circumferentially during longitudinal movement of the internally threaded fastener 24 along the threaded fastener 10. The arms 40 are curved in a manner complimentary to the sides 42 of legs 16 to help align the leg's teeth 20 and cam segments 36.

Turning next to the torque application member 28 portion of internally threaded member 24, the torque applying member's inner bore with threads 46 engaging threads 44 is normally assembled as shown in FIG. 11 with all faces flush and appearing from the side as a normal nut or similar fastener. The threaded juncture between the two pieces allows the two parts to rotate relative to each other and the torque applying means 28 can be used to exert additional pressure once the barrel shaped engaging member 26 is locked in the desired position. The torque applying member 28 and the barrel shaped member 26 have a locking member located at the their interface to keep them in the normal configuration until torque is to be applied at which time the locking means will disengage and the torque applying member can be rotated relative to the barrel member to apply the desired mount of torque.

Figure 6:
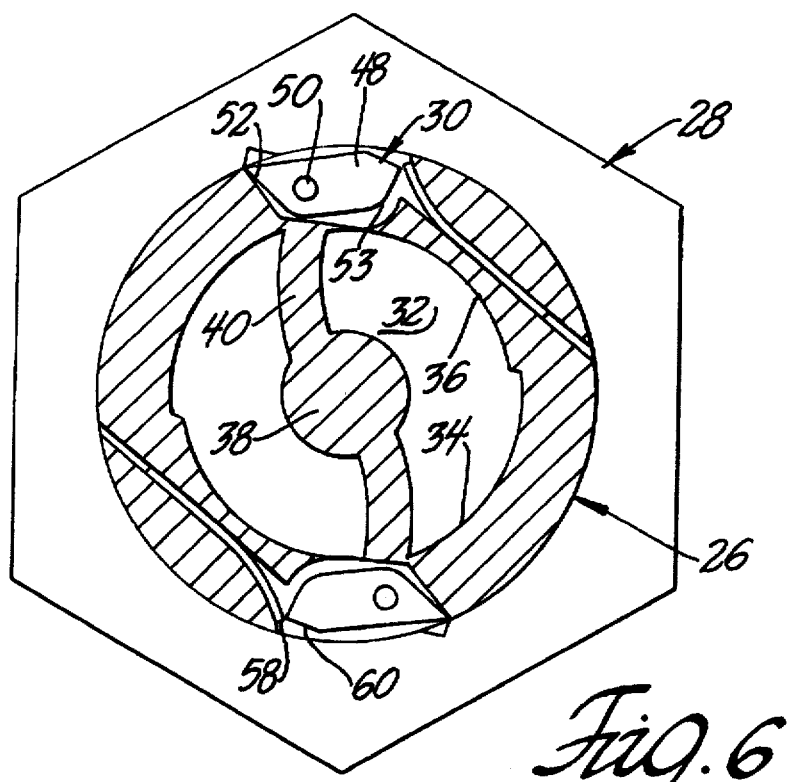
FIG. 6 is a front view in partial section of the fastener of FIG. 5 with its locking means in the in the torque applying position.

FIGS. 5 and 6 show one embodiment of a locking means 30 useful in the practice of this invention. Locking means 30 has a pair of pawls 48 mounted on pins 50 and enclosed in a shaped chamber 52 formed in barrel member 26. The pawl 48 in the normal position shown in FIG. 5 has a point 52 which engages a complimentary locking surface 54 formed in the torque applying member 28. The pawl 48 is biased into the locked position of FIG. 5 by a biasing spring 56, a cantilevered flat strip having one end firmly embedded in the barrel member 26 and a free end 58 pressing against a complimentary surface on the pawl. The biasing spring 56 will provide enough force to maintain the pawl 48 in the locking position, FIG. 5, as the threaded fastener 24 is being rotated until the helical cam surfaces 36 have substantially engaged the helical teeth 20. At this juncture, the teeth 20 of the threaded fastener 10 will contact the surface 53 on the pawl 48 which is in the space being entered by the teeth on the threaded fastener. The teeth 20 will provide a camming action as they rotate relative to the internally threaded fastener 24. This camming action moves the pawl 48 to the position shown in FIG. 6 with the point 52 being nestled within a shaped chamber in barrel member 26. The pawl 48 disengagement allows the torque application member 28 to continue rotating relative to the barrel member 26 and apply additional torque to the surfaces being joined.

Figure 7:
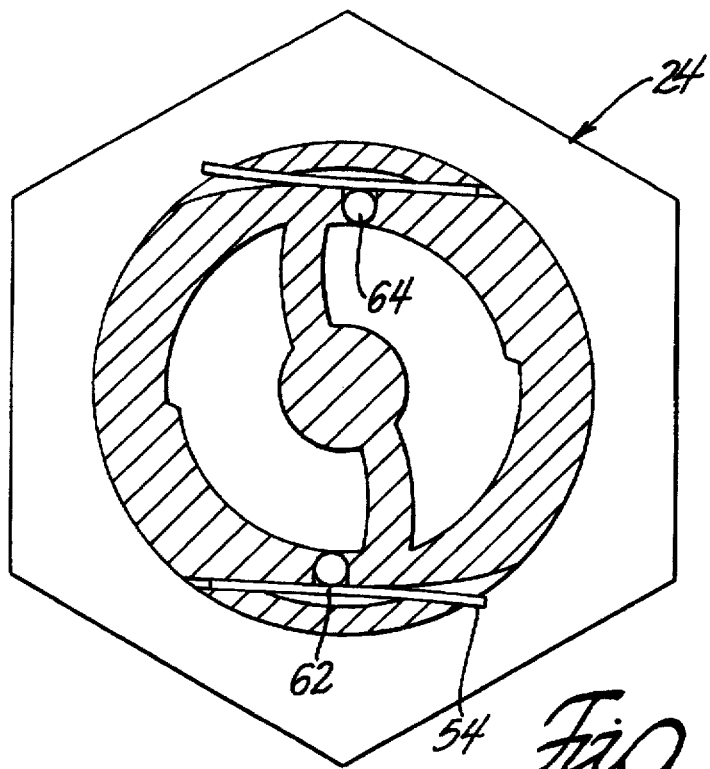
FIG. 7 is a front view in partial section of a fastener assembly according to this invention adapted to engage the threaded fastener of FIG. 3 with an alternate locking means in its normal position.
Figure 8:
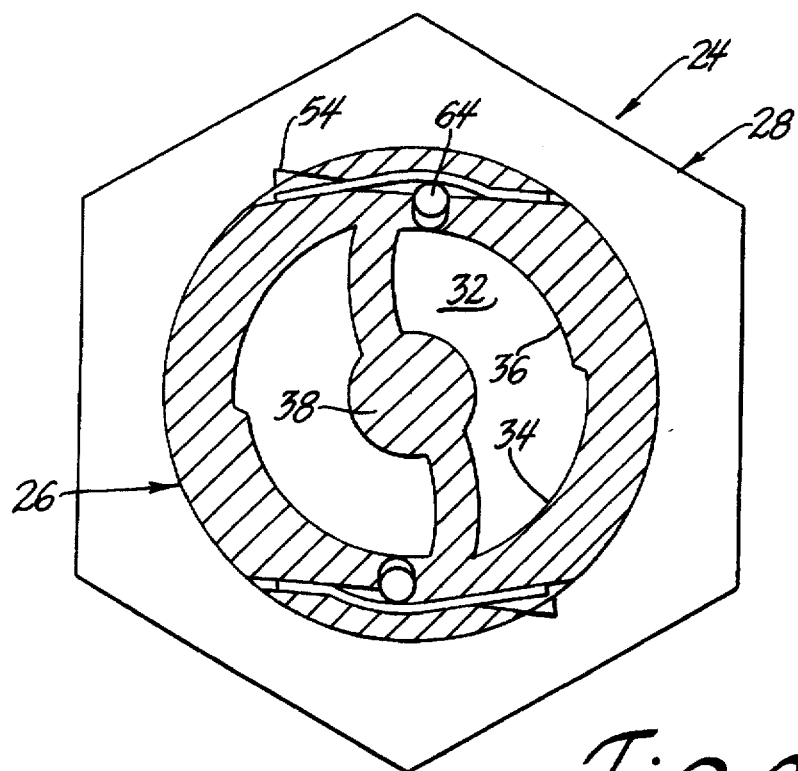
FIG. 8 is a from view in partial section of the fastener of FIG. 7 with its locking means in the torque applying position.

A second type of locking means is shown in FIGS. 7 and 8 where the barrel member 26 and torque application member 28 are locked in position by means of the spring 62 and disengaging the spring from the with torque applying member 28 a leaf spring member 62 having one end firmly attached to the barrel member and the other end being unrestrained and resting against the locking surface 54 formed in the torque applying member 28. This second locking means has a ball 64 located near the midpoint of the leaf spring 62. As the threaded fastener 24 rotates until the helical cam surfaces 36 have substantially engaged the helical teeth 20, the teeth 20 of the threaded fastener 10 will contact the surface of the ball 64. This provides a camming action to move the ball 64 radially outward to the position shown in FIG. 8 flexing. The disengagement allows the torque application member 28 to continue rotating relative to the barrel member 26 and apply additional torque to the surfaces being joined as with the previous embodiment.

Figure 9:
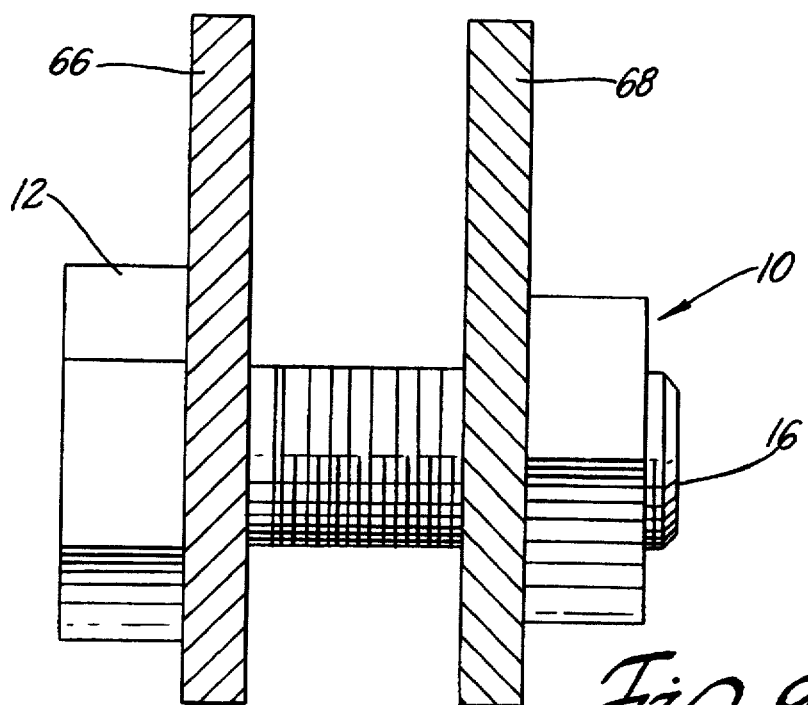
FIG. 9 is a side view in partial section showing one embodiment of this invention to be used to fasten two plates together.
Figure 10:
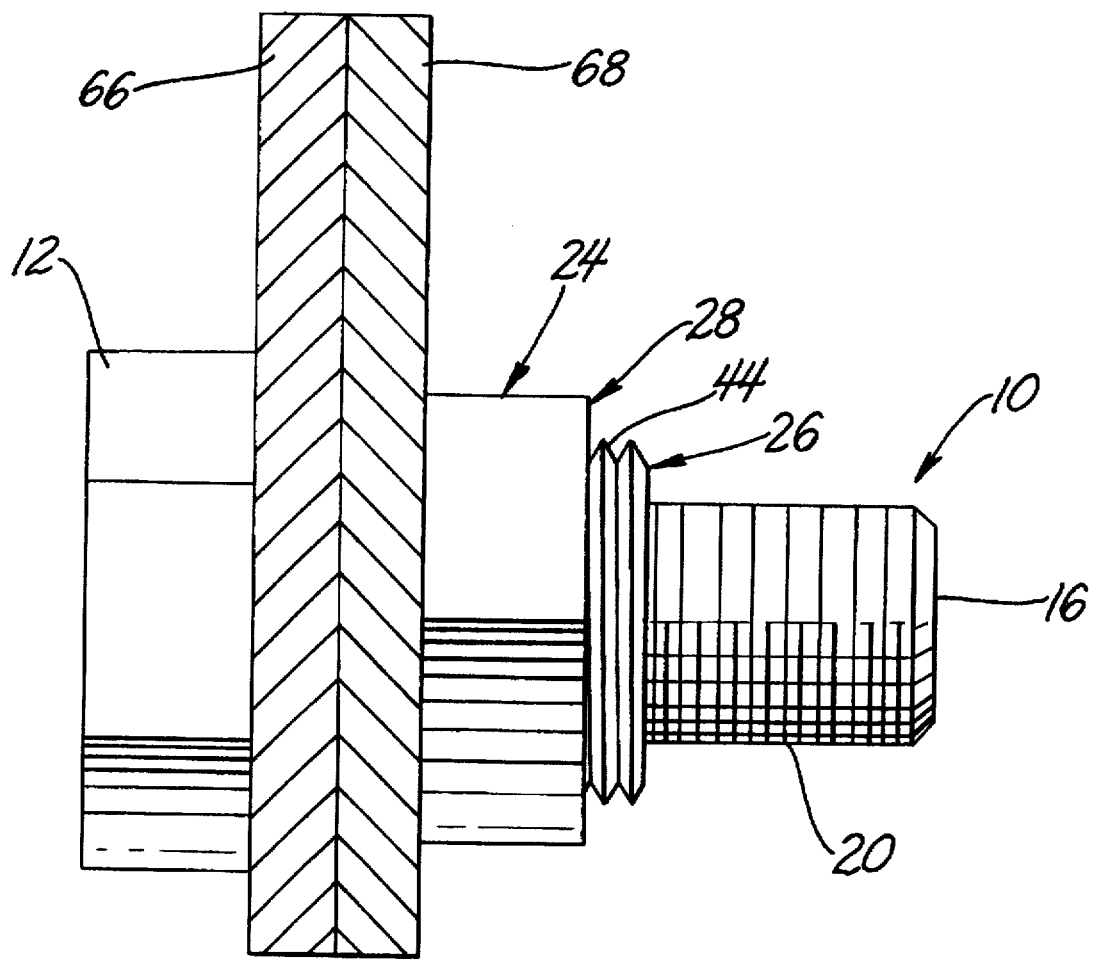
FIG. 10 is a side view in partial section showing the fastener of FIG. 9 in the torque applying position.

FIGS. 9 and 10 show the operation of the present invention. The externally threaded fastener 10 has been passed through apertures, not shown, in two plates 66 and 68 which are to be clamped together. Head 12 of externally threaded fastener 10 is juxtaposed one surface of the plate 66 with the legs 16 extending through both plates 66, 68. The plates 66, 68 can be brought close together and the internally threaded fastener 24 is urged onto the legs 16 with each cavity 32 surrounding a corresponding leg 16. The cavity is disposed so the arcuate portion 34 is over the teeth 20 of the fastener 10 to allow the internally threaded member 24 to be moved longitudinally toward the head 12 of externally threaded fastener 10. As the internally threaded fastener 24 is urged onto the externally threaded fastener 10, the core 38 will maintain the legs 16 apart keeping the bore 22 open. The arms 40 serve to keep the legs 16 from collapsing inward and allow the internally threaded fastener 24 to move easily to a position where the plates are touching and the internally threaded fastener 24 is juxtaposed the outer surface of plate 68. At this point, torque is applied to the threaded fastener to begin the tightening action. The initial torquing will rotate the internally threaded fastener 24 as a unit causing the helical cams 36 to engage complimentary teeth 20 of the externally threaded fastener 16. After about a quarter turn as shown, the barrel member 26 will stop turning as the teeth 20 disengage the mechanism joining the barrel member and the torque applying member, The application of additional torque will cause the locking means 30 to disengage and the torque applying 28 member continues to rotate about the barrel member 26 towards the plate 68 applying additional torque to the plate and further consolidating the structure. The end result is shown in FIG. 10 where the barrel member 26 and the torque applying member 28 are displaced relative to each other.

I wish it to be understood that I do not desire to be limited to the exact details of construction or method shown herein since obvious modifications will occur to those skilled in the relevant arts without departing from the spirit and scope of the following claims.

I claim:

1. A quick attachment threaded fastener assembly for attaching two or more pieces together comprising:

a shaped externally threaded fastener having an enlarged head portion and an elongated body portion, having a longitudinal axis, extending from said head, the body portion being formed from a plurality of spaced arcuately cross sectioned leg members, said leg members having shaped inner surfaces which define a shaped inner bore which extends along the body portion of the longitudinal axis of the externally threaded fastener, and thread segments formed on the outer surface of said legs;

a first barrel shaped engaging means having an internal surface defining an internal cavity a portion of the inner surface of the cavity being sufficiently large to allow easy longitudinal movement of the threaded fastener legs there through and a portion of the inner surface of the cavity having thread segments complimentary to the thread segments of the threaded fastener and adapted to engage the threaded fastener when the first engaging means is rotated, the engaging means having a shaped core member having an outer surface sized to engage the shaped inner bore formed by the inner surfaces of said legs to prevent said legs from collapsing inward radially, a plurality of radially disposed arms corresponding in number to the number of legs formed in the threaded fastener, the arms being attached to the inner surface of the enraging means and the outer surface of the core member, the arms holding the core member axially aligned within the bore and the arms serving to spread and maintain the legs open during longitudinal movement of the engaging means along the threaded fastener, said engaging means having a threaded outer surface;

a torque application member associated with the engaging member, the torque application member having an internally threaded bore engaging the outer threaded surface of the engaging means; and at least one locking means associated with the engaging means, and torque application member, the locking means serving to keep the engaging member and torque application member joined until the thread segments of the engaging member have been rotated into the thread segments on the threaded fastener and then disengaging to allow the torque application member to rotate relative to the engaging member applying additional pressure to the pieces being joined.

2. The fastener of claim 1, where the locking means associated with the engaging means and torque application member serving to keep the engaging means member and torque application member joined further comprises: a leaf spring member having one end firmly attached to the engaging means and an other end being unrestrained and resting against a locking surface formed in the torque application member, the locking means having a ball located near the midpoint of the leaf spring so as the threaded fastener rotates until the thread segments on the outer surface of the legs have substantially engaged the thread segments of the inner surface of the engaging means cavity the thread segments of the threaded fastener will contact the surface of the ball to provide a camming action and move the ball radially outward flexing the leaf spring, thereby disengaging the torque application member and allowing it to continue rotating relative to the barrel member and apply additional torque to the pieces being joined.

3. The fastener of claim 1, where the locking means associated with the engaging means and torque application member serving to keep the engaging member and torque application member joined further comprises: at least one pawl mounted on a pin and enclosed in a shaped chamber formed in the engaging means, the pawl in a first position engaging a complimentary locking surface formed in the torque application member the pawl being biased into a locked position by a a cantilevered flat strip having one end firmly embedded in the engaging means and a free end pressing against a complimentary surface on the pawl, the biasing member providing enough force to maintain the pawl in the locking position, and being positioned so as the threaded listener is rotated into engagement until the thread segments on the outer surface of the legs have engaged the thread segments of the inner surface of the engaging means cavity, the thread segments of the threaded fastener will contact a surface on the pawl in the space being entered by the thread segments, the thread segments providing a camming action which moves the pawl to a disengaged position where the pawl is contained within a shaped chamber in said engaging means, the pawl disengagement allowing the torque application member to continue rotating relative to the engaging means and apply additional torque to the pieces being joined.

* * * * *